United States Patent
Nagase et al.

(10) Patent No.: US 9,774,359 B2
(45) Date of Patent: Sep. 26, 2017

(54) CARD HOLDING MEMBER AND CARD CONNECTOR

(71) Applicant: Molex, LLC, Lisle, IL (US)

(72) Inventors: Teruki Nagase, Yamato (JP); Akihiro Shimotsu, Ebina (JP)

(73) Assignee: Molex, LLC, Lisle, IL (US)

( * ) Notice: Subject to any disclaimer, the term of this patent is extended or adjusted under 35 U.S.C. 154(b) by 0 days.

(21) Appl. No.: 14/950,077

(22) Filed: Nov. 24, 2015

(65) Prior Publication Data

US 2016/0164225 A1    Jun. 9, 2016

(30) Foreign Application Priority Data

Dec. 3, 2014 (JP) .................................. 2014-244791

(51) Int. Cl.
*H01R 24/00* (2011.01)
*H04B 1/3816* (2015.01)

(52) U.S. Cl.
CPC .................................. *H04B 1/3816* (2013.01)

(58) Field of Classification Search
CPC ..... H01R 27/00; H01R 13/635; H01R 13/633
USPC .......................................... 439/630, 159, 160
See application file for complete search history.

(56) References Cited

U.S. PATENT DOCUMENTS

| 6,602,096 | B1 | 8/2003 | Kronestedt et al. |
| 7,059,911 | B2 | 6/2006 | Uchida et al. |
| 2012/0276780 | A1* | 11/2012 | Hu ....................... H01R 12/714 439/630 |

FOREIGN PATENT DOCUMENTS

CN    202178465 U    3/2012

* cited by examiner

*Primary Examiner* — Phuong Chi T Nguyen
(74) *Attorney, Agent, or Firm* — James A. O'Malley

(57) ABSTRACT

The card holding member is able to hold a card including terminal members and is able to be inserted into a card connector, and comprises a frame portion opposing the side surfaces of the card, and a movable lock portion arranged in the frame portion which is able to engage and disengage from a lock portion of the card connector, the movable lock portion being a spring member made of a metal plate and including at least one corner portion, and the movable lock portion also being elastically deformable in the width direction of the card holding member.

18 Claims, 7 Drawing Sheets

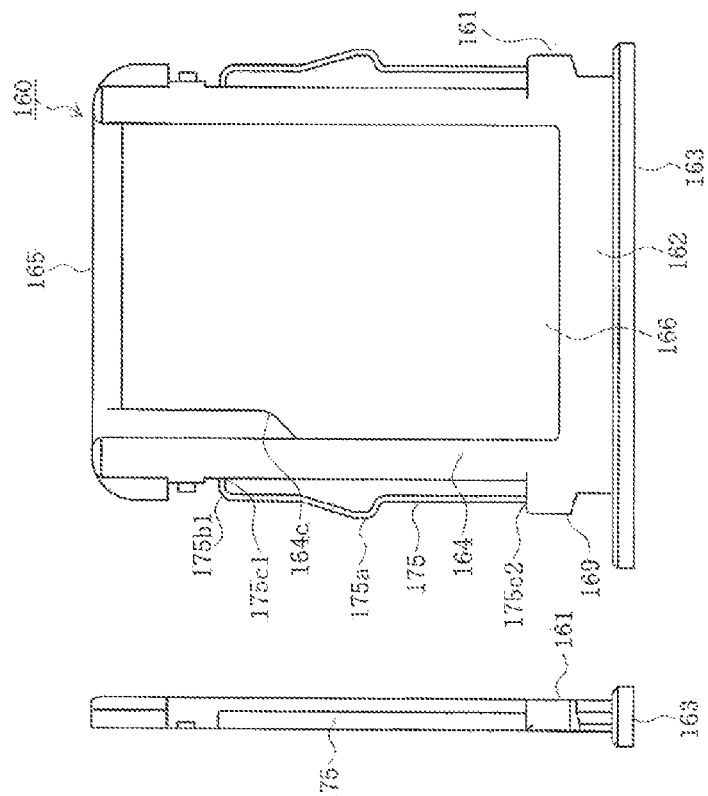
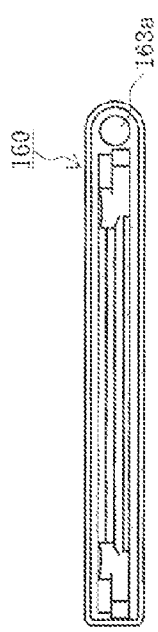
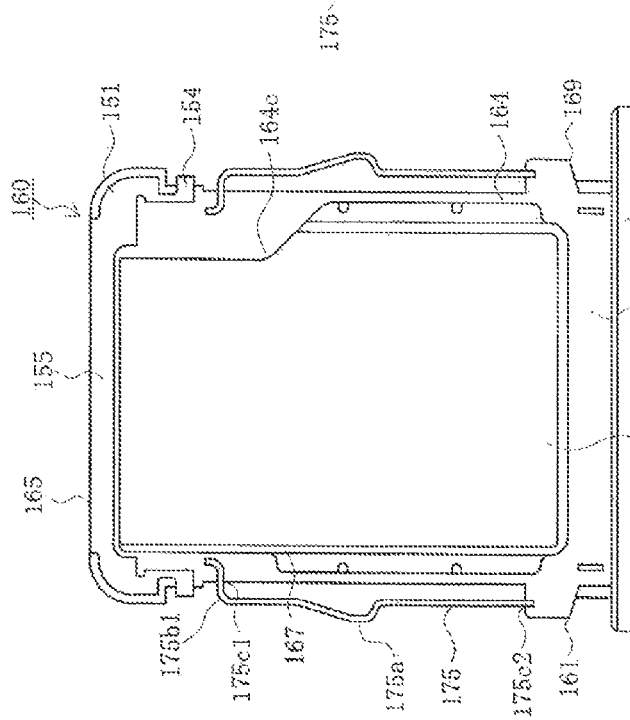

CARD HOLDING MEMBER AND CARD CONNECTOR

RELATED APPLICATIONS

This application claims priority to Japanese Application No. 2014-244791, filed Dec. 3, 2014, which is incorporated herein by reference in its entirety.

TECHNICAL FIELD

The present disclosure relates to a card holding member and to a card connector.

BACKGROUND ART

Electronic devices such as mobile phones include a card connector enabling the use of various types of cards such as SIM (Subscriber Identity Module) cards.

Electronic devices have become significantly smaller in recent years, and so have cards and card connectors. As a result, it can be difficult for users to grasp a card with the fingers and insert the card properly into a card connector. Therefore, card connectors have been proposed in which a card is set inside a card holder and the card holder is inserted into the card connector (see, for example, Patent Document 1).

FIG. 7 is a perspective view of a card tray of the prior art.

In this drawing, 967 denotes a bottom panel of a card tray made of a resin material, 964 denotes the pair of side walls, and 965 denotes the front wall. The card tray is moved in the direction indicated by arrow A with a card (not shown) housed inside the recessed portion defined by the bottom panel 967, the side walls 964, and the front wall 965.

A contact piece 968 is formed in the middle of each side wall 964 which bulges to form a semicircular profile, and a protrusion-shaped engaging portion 969 is formed near the front end of each side wall portion 964. When the card tray is inserted into the card connector, the contact pieces 968 make elastic contact with and slide along left and right guide walls inside the card connector to keep the card tray stable in the transverse direction. The engaging portions 969 are prevented from passing the inner lock portions on the guide walls.

[Patent Document 1]Laid-Open Patent Publication No. 2006-059660

SUMMARY OF THE INVENTION

However, the card tray of the prior art is only held inside the card connector by the engaging portions 969 preventing the card tray from passing the inner lock portions on the guide walls in the card connector. As a result, the retention force is weak and the card tray may become detached from the card connector during use. Also, because the contact pieces 968 only make elastic contact with the guide walls in the card connector, they do not reliably hold the card tray inside the card connector.

It is an object of the present disclosure to solve this problem by providing a highly reliable card holding member that can be easily inserted into a card connector and reliably held by the card connector, and a card connector for the card holding member.

The present disclosure is a card holding member able to hold a card including terminal members and able to be inserted into a card connector, the card holding member comprising a frame portion opposing the side surfaces of the card, and a movable lock portion arranged in the frame portion able to engage and disengage from a lock portion of the card connector, the movable lock portion being a spring member made of a metal plate and including at least one corner portion, and the movable lock portion also being elastically deformable in the width direction of the card holding member.

In another aspect of the card holding member of the present disclosure, the movable lock portion is a band-like member fixed to the frame portion at both ends and including a main body portion extending linearly, and an engaging portion formed in the middle of the main body portion and able to engage the lock portion, the corner portion being connected to at least one end of the main body portion.

In another aspect of the card holding member of the present disclosure, the corner portion is a portion of a metal plate bent from the longitudinal direction of the card holding member to a direction intersecting the longitudinal direction.

In another aspect of the card holding member of the present disclosure, the engaging portion includes a front inclined surface and a rear inclined surface formed in front of and behind an apex point, the engaging portion being a protruding portion bulging outwardly in the transverse direction of the card holding member, and the lock portion being a recessed portion including a front inclined surface and a rear inclined surface.

In another aspect of the card holding member of the present disclosure, the corner portion is connected only to the front end of the main body portion, the rear end of the main body portion being secured to the frame portion.

The present disclosure is also a card connector able to receive any one of the inserted card holding members described above, the card connector including a lock portion able to engage and disengage from the movable lock portion.

In another aspect of the card connector of the present disclosure, the card connector may include an ejection mechanism for ejecting the card holding member.

The present disclosure is able to provide a highly reliable card holding member that can be easily inserted into a card connector and reliably held by the card connector.

BRIEF DESCRIPTION OF THE DRAWINGS

FIG. 3(a) is a front view of the card tray according to an embodiment of the present disclosure.

FIG. 3(b) is a top view of the card tray of FIG. 3(a).

FIG. 3(c) is a rear view of the card tray of FIG. 3(a).

FIG. 3(d) is a side view of the card tray of FIG. 3(a).

FIG. 3(e) is a bottom view of the card tray of FIG. 3(a).

DETAILED DESCRIPTION OF THE PREFERRED EMBODIMENTS

The following is a detailed explanation of an embodiment of the present disclosure with reference to the drawings.

Figures 1A, 1B:
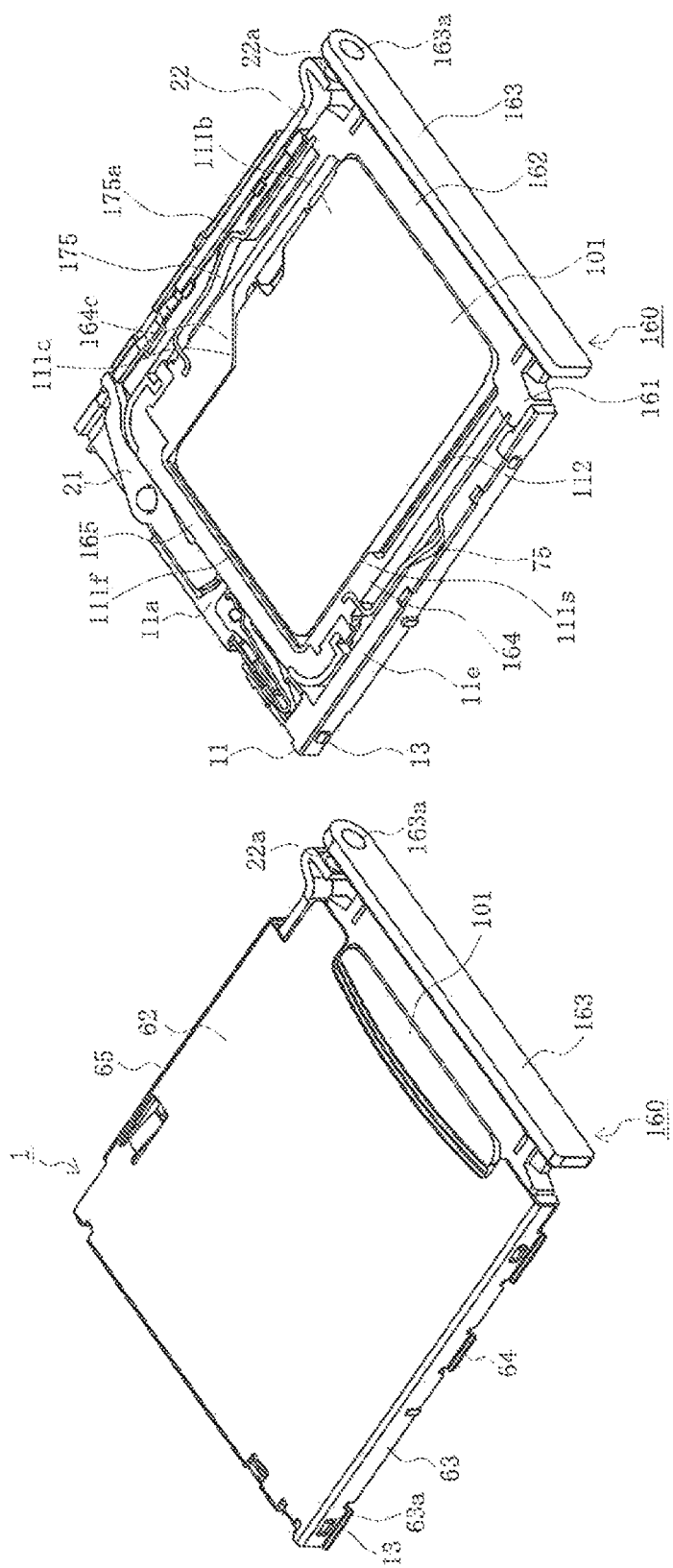
FIG. 1(a) is a perspective view of a card tray inserted into a card connector according to an embodiment of the present disclosure, in which the shell is attached.
FIG. 1(b) is a perspective view of the card tray of FIG. 1(a) with the shell removed.
Figure 2:
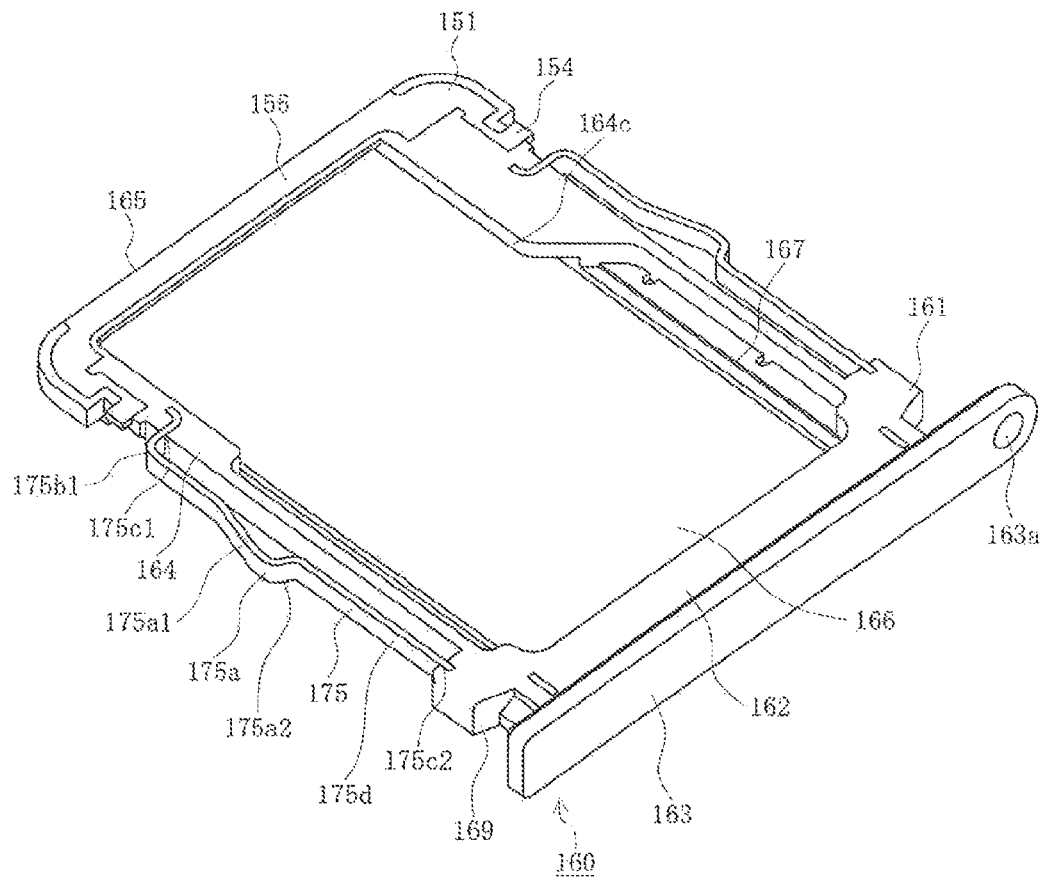
FIG. 2 is a perspective view of the card tray according to an embodiment of the present disclosure.
Figures 4A, 4B:
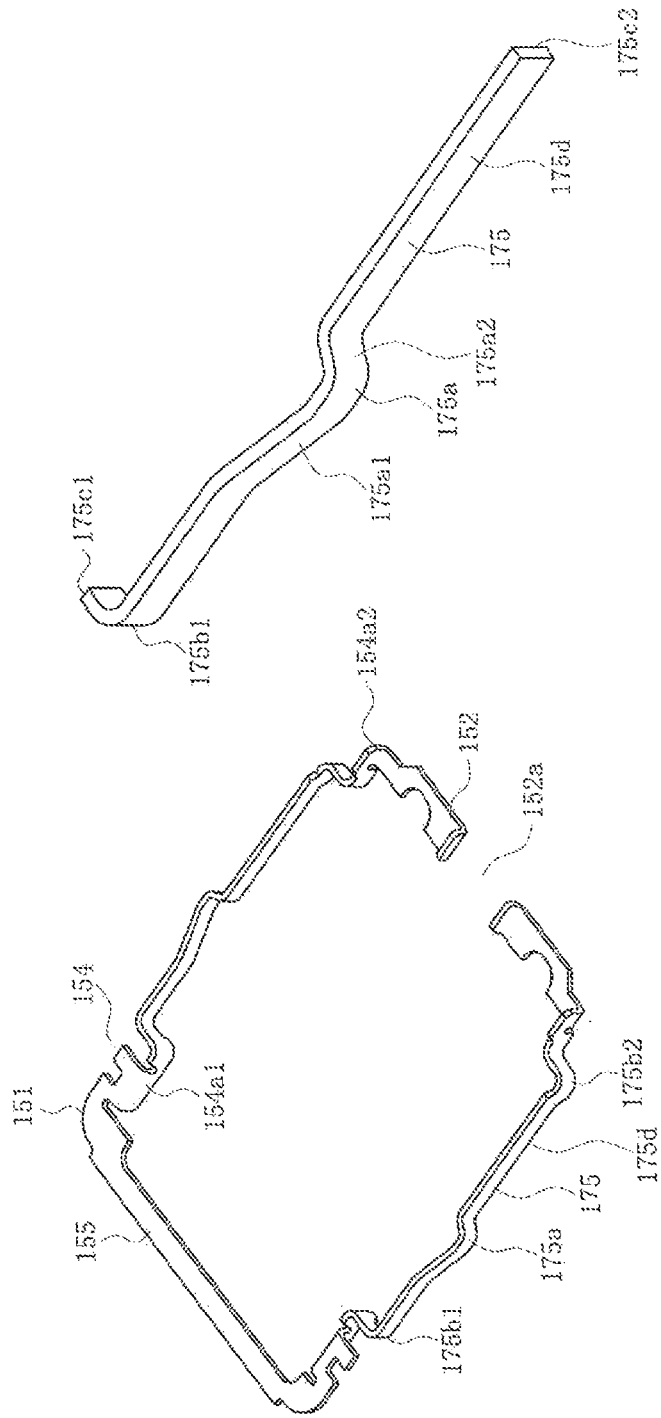
FIG. 4(a) is a perspective view of the metal portion of the entire card tray in an embodiment of the present disclosure.
FIG. 4(b) is a perspective view of an enlarged view of a portion of the metal portion of the entire card tray of FIG. 4(a).
Figures 5A, 5B:
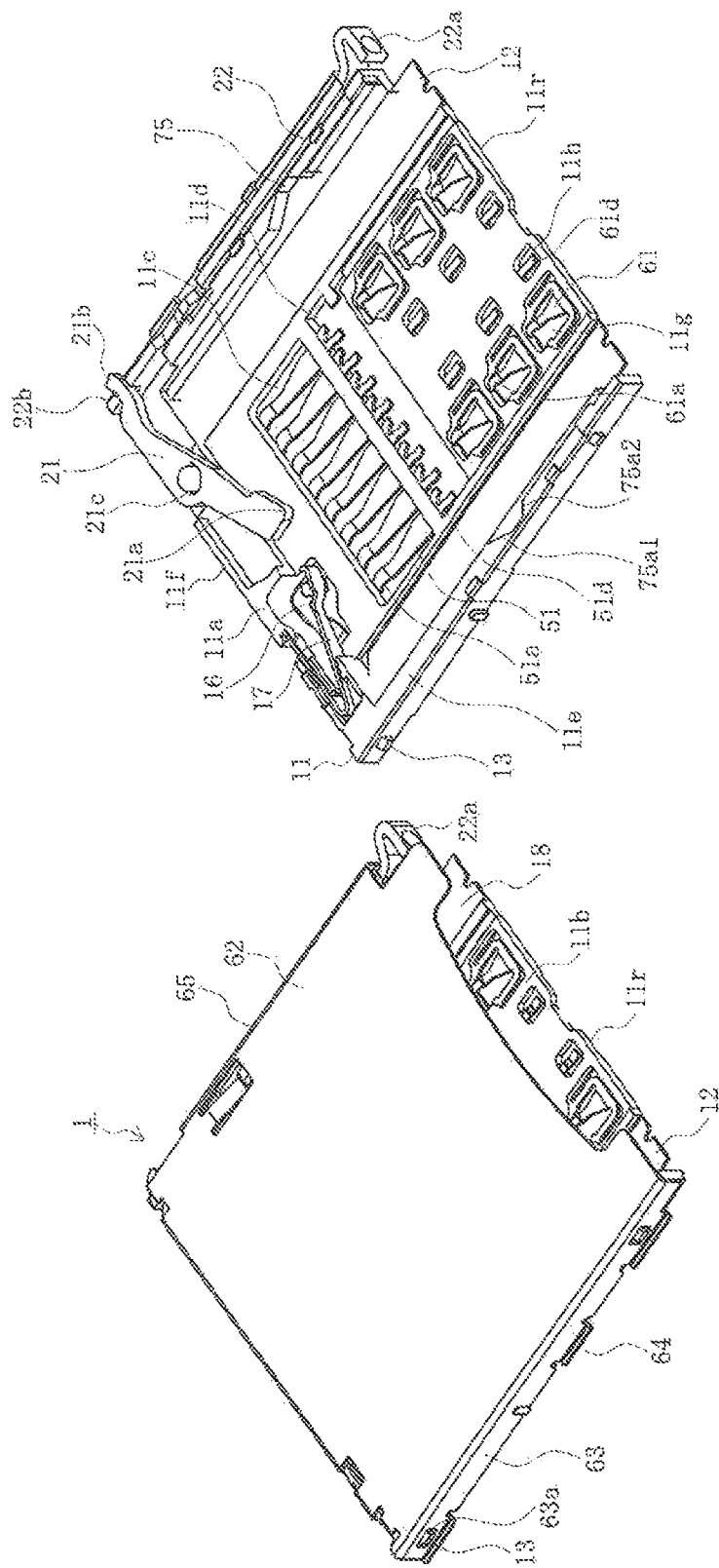
FIG. 5(a) is a perspective view of a card connector according to an embodiment of the present disclosure, in which the shell is attached.
FIG. 5(b) is a perspective view of the card connector of FIG. 5(a) with the shell removed.

FIGS. 1(a) and 1(b) are a pair of perspective views of a card tray inserted into a card connector according to an embodiment of the present disclosure. FIG. 2 is a perspective view of the card tray according to an embodiment of the present disclosure. FIGS. 3(a), 3(b), 3(c), 3(d), 3(e) are a set of five views of the card tray according to an embodiment of the present disclosure, FIGS. 4(a) and 4(b) are a pair of perspective views of the metal portion of the card tray in an embodiment of the present disclosure. FIGS. 5(a) and 5(b) are a pair of perspective views of a card connector according to an embodiment of the present disclosure.

In the drawings, 160 is the card tray serving as the card holding member in the present embodiment. As shown in FIG. 1(a), the card tray 160 is inserted into a card connector 1 mounted in an electronic device (not shown) while housing a card 101. In other words, a card 101 is accommodated inside the card tray 160 with both side surfaces 112 surrounded by the frame portion 161 facing the side surfaces 112, and is mounted in an electronic device via a card connector 1. The electronic device may be any type of device, including a personal computer, a mobile phone, a smartphone, a communication modem, a tablet, a digital camera, a video camera, a music player, a gaming console, or a car navigation system.

However, when a card connector other than card connector 1 is mounted in an electronic device, the user sometimes does not use the card connector 1. In this case, the user can insert the empty card tray 160, that is, the card tray 160 not housing a card 101, into the card connector 1 for storage.

The card 101 can be any type of card such as a SIM card, microSIM card, nanoSIM card, MMC® (Multi Media) card, SD® (Secure Digital) card, miniSD® card, xD-Picture® card, Memory Stick®, Memory Stick Duo®, Smart Media®, or Trans-Flash® memory card. In the present embodiment, the card is a microSD® card.

In the present embodiment, as shown in FIG. 1(b), the card 101 has a substantially rectangular band-like shape, and electrode pads serving as the terminal members (not shown) are arranged in rows along the front end 111f on one surface (the lower surface in the example shown in the drawing). Electrode pads are not provided on the other surface, that is, on the upper surface 111b opposite the lower surface. A notched portion 111c is formed in one of the corners connecting the left and right ends of the front end 111f to the side ends 111s. More specifically, this notched portion is formed in the front right corner of the upper surface 111b. The notched portion 111c is formed by cutting away one of the corners where the front end 111f of the card 101 is connected to a side end 111s so as to form a truncated triangle.

In the present embodiment, the expressions indicating direction, such as upper, lower, left, right, front and rear, which are used to explain the configuration and operation of each portion of the card connector 1, card tray 160, and card 101, are relative and not absolute. They depend on the orientation of the connector 1, card tray 160, and card 101, and their constituent components shown in the drawings. When the orientation of the connector 1, card tray 160, and card 101 or their constituent components changes, the interpretation changes in response to the change in orientation.

Here, the card tray 160 includes a metal portion 151 integrally formed by stamping and bending a metal plate, and a resin portion 169 made of an insulating resin covering and becoming integrated with a portion of the metal portion 151 using a molding technique such as insert molding or overmolding.

The frame portion 161 of the card tray 160 is a rectangular frame member surrounding all four sides of a space 166 serving as the card accommodating space for accommodating a card 101. The frame portion 161 has a rear frame portion 162 and a front frame portion 165 extending parallel to each other in the transverse direction. The frame portion 161 also has a pair of side frame portions 164 extending in the longitudinal direction and connected to both ends of the rear frame portion 162 and the front frame portion 165.

A protruding portion 164c is formed in a corner, more specifically, the front right corner, where one of the side frame portions 164 is connected to the front frame portion 165. The protruding portion 164c functions as a card orientation restricting portion. As shown in the drawing, when the card 101 has the proper orientation, the card 101 is allowed to be housed inside the card tray 160. However, when the card 101 does not have the proper orientation, the card 101 is not allowed to be housed inside the card tray 160. In other words, the card 101 cannot be housed inside the space 166. More specifically, the protruding portion 164c has a truncated triangle profile and is formed in a way to correspond to the notched portion 111c of the card 101 housed inside the space 166 in the proper orientation. As a result, a card 101 cannot be inserted into and housed in the space 166 inside the card tray 160 when oriented improperly, that is, when inserted upside-down or backwards.

A rear panel portion 163 is connected to the rear of the rear frame portion 162. A through-hole 163a is formed at one end of the rear panel portion 163 and passes through the rear panel portion 163 in the thickness direction. The through-hole 163a allows an auxiliary member such as a pin or rod to be inserted in order to apply pressure and operate the operating portion 22a of the push rod 22 in the card connector 1.

The upper surfaces of the rear frame portion 162, the side frame portion 164, and the front frame portion 165, excluding the rear side portion 163, are flush. However, the lower surface of the front frame portion 165 is preferably higher than the lower surface of the side frame portions 164. The lower surface of the front frame portion 165 is also preferably higher than the lower surface of a card 101 held inside the space 166. In this way, the front frame portion 165 does not make contact with the primary terminals 51 and secondary terminals 61 when the card tray 160 is inserted into the card connector 1.

Eaves portions 167 extend into the space 166 from the inner lower ends of the rear frame portion 162 and the left and right side frame portions 164. The eaves portions 167 function as card support portions for supporting at least some of the lower surface of the card 101 held inside the space 166, for example, near the side ends.

The side surfaces of the front frame portion 165, the rear frame portion 162, and the side frame portions 164 facing the space 166, that is, the inside surfaces, are all coated with an insulating resin so that the metal portion 151 is not exposed. Therefore, even though the peripheral edges of the electrode pads arranged on the lower surface of the card 101 housed inside the space 166 are exposed on the side surfaces 112 of the card 101, they do not come into contact with the metal portion 151.

As shown in FIG. 4(*a*), the metal portion 151 is a frame member with a substantially rectangular profile, and includes a rear metal frame portion 152 and a front metal frame portion 155 extending in the transverse direction substantially parallel to each other, and a pair of metal side frame portions 154 extending on the longitudinal direction and connecting both ends of the rear metal frame portion 152 to both ends of the front metal frame portion 155. In the example shown in the drawing, the rear metal frame portion 152 includes a cutaway portion 152*a* in the middle dividing the section to the right and left. However, the section without the cutaway portion 152*a* is a single continuous body.

In the present embodiment, each metal side frame portion 154 includes a lock spring portion 175 in the middle, which is a movable lock portion for holding the card tray 160 inserted into the card connector 1. The lock spring portions 175 function as plate springs elastically displaced in the transverse direction of the card tray 160. Therefore, these plate-like members extend in the thickness direction (vertical direction) of the card tray 160. As in the case of the rear metal frame portion 152 and the front metal frame portion 155, the other portions of the metal side frame portions 154 are plate-like members extending parallel to the upper surface or the lower surface of the card tray 160. As a result, the longitudinal ends of the lock spring portions 175 are connected to the other portions of the metal side frame portions 154. In the explanation of the present embodiment, the front bent portion 154*a*1 and the rear bent portion 154*a*2 are sometimes referred to collectively as the bent portions 154*a*.

The lock spring portions 175 are slender band-like members with spring action extending in the thickness direction of the card tray 160 and extending in the longitudinal direction of the card tray 160. They include a plate-like main body portion 175*d* exposed to the outside of the side frame portion 164, extending linearly in the longitudinal direction of the card tray 160, and fixed at both ends to the side frame portion 164 to function as a beam. Before the metal portion 151 has been integrated with the resin portion 169, the lock spring portions 175, as shown in FIG. 4(*a*), include a front corner portion 175*b*1 connected to the front end of the main body portion 175*d* and a rear corner portion 175*b*2 connected to the rear end of the main body portion 175*d*. The front corner portion 175*b*1 and the rear corner portion 175*b*2 are preferably bent from the longitudinal direction of the card tray 160 to a direction intersecting the longitudinal direction, preferably at a 90-degree angle. In the following explanation, these components are sometimes referred to collectively as the corner portions 175*b*. The lock spring portions 175 functioning as beam-like plate springs include a front corner portion 175*b*1 and a rear corner portion 175*b*2 connected at both ends to the main body portion 175*d*. This increases the flexibility and amount of elastic displacement. In order to adjust the amount of elastic displacement, either the front corner portion 175*b*1 or the rear corner portion 175*b*2 can be omitted.

In the example shown in the drawings, the rear corner portion 175*b*2 is embedded in the resin portion 169 near the rear end of the side frame portion 164. Therefore, in the lock spring portions 175 of the example shown in the drawings, the front fixed portion 175*c*1 fixed to the side frame portion 164 is the front end and the rear fixed portion 175*c*2 fixed to the side frame portion 164 is the rear end. In other words, the lock spring portions 175 only include the front corner portion 175*b*1 in the section exposed to the outside of the side frame portion 164 from the front fixed portion 175*c*1 to the rear fixed portion 175*c*2. FIG. 4(*b*) shows the lock spring portion 175 from the front fixed portion 175*c*1 at the front end to the rear fixed portion 175*c*2 at the rear end. The rear fixed portion 175*c*2 is the main body portion 175*d*.

The lock spring portion 175 includes a lock protruding portion 175*a* in the middle, which is an engaging portion elastically displaced inward in the transverse direction of the card tray 160. The lock protruding portion 175*a* is a protruding portion bulging outward in the transverse direction of the card tray 160, and includes a gently sloping front inclined surface 175*a*1 and a sharply sloping rear inclined surface 175*a*2 near the apex. When the card tray 160 has been completely inserted into the card connector 1, the lock protruding portions 175*a* are engaged in the lock recessed portions 75 serving as the lock portions on the card connector 1.

In the present embodiment, as shown in FIG. 5(*a*), the card connector 1 has a housing 11 integrally molded from an insulating material such as a synthetic resin, and a shell 65 or cover member formed integrally by punching and bending a conductive metal sheet which is attached to the upper side of the housing 11. The shell 65 has a substantially rectangular ceiling panel portion 62 and side panel portions 63 erected on the side edges of the ceiling panel portion 62, and covers the housing 11 and at least some of the upper portion of the card tray 160 inserted into the housing 11 and the card connector 1. The card connector 1 has a substantially parallelepiped shape, and is mounted on the surface of a board such as a printed circuit board in the electronic device. A card tray 160 is inserted into the insertion slot 18 in the rear (below right in FIG. 5(*a*)). More specifically, the card tray 160 is inserted into the card insertion space between the housing 11 and the shell 65.

The housing 11 includes primary terminals 51, secondary terminals 61, and a lower shell 12 integrally formed by stamping and bending a metal plate. This substantially plate-like member is integrally molded using a molding technique such as insert molding or overmolding with an insulating resin which covers and becomes integrated with at least a portion of the primary terminals 51, secondary terminals 61, and lower shell 12. The lower shell 12 is a frame member for reinforcing the housing 11, and is preferably formed from the same material as the primary terminals 51 and/or secondary terminals 61, but is electrically insulated from the primary terminals 51 and the secondary terminals 61.

The housing 11 also includes a bottom wall portion 11*b* serving as the substantially rectangular, plate-like terminal holding portion, an inner wall portion 11*a* thicker than the bottom wall portion 11*b* which extends in the transverse direction of the housing 11 along the front end portion 11*f* in the insertion direction (longitudinal direction) of the card tray 160, and a pair of side wall portions 11*e* thicker than the bottom wall portion 11*b* extending in the insertion direction of the housing 11 along both side edges. The lower surfaces of the inner wall portion 11*a* and the side wall portions 11*e* are flush with the lower surface of the bottom wall portion 11*b*, and the upper surfaces are above the upper surface of the bottom wall portion 11*b*. The end portion of the housing 11 in the insertion direction of the card tray 160 is referred to as the rear end portion 11*r*.

Here, the bottom wall portion 11*b* includes a primary terminal holding recessed portion 11*c* and secondary terminal holding recessed portions 11*g* for holding the exposed portions of the primary terminals 51 and the secondary terminals 61, as well as a primary terminal solder tail opening 11*d* and secondary terminal solder tail openings 11*h*. The primary terminal holding recessed portion 11*c*, secondary terminal holding recessed portions 11*g*, primary terminal solder tail opening 11*d*, and secondary terminal solder tail openings 11*h* are openings which pass through the bottom wall portion 11*b* in the thickness direction.

There is a single primary terminal holding recessed portion 11*c* and primary terminal solder tail opening 11*d*, and a single row of primary terminals 51 extending in the transverse direction of the housing 11 is arranged inside. At least a portion of the primary terminals 51 is embedded in the bottom wall portion 11*b*, and at least the contact portion 51*a* is exposed inside the primary terminal holding recessed portion 11*c*. The solder tail portion 51*d* of each terminal to be soldered is also exposed inside the primary terminal solder tail opening 11*d*. The contact portion 51*a* of each primary terminal 51 is biased upwards by the spring action of the arm portion, and comes into contact with the corresponding electrode pad on the card 101 inside the card tray 160 held inside the card connector 1. Each solder tail portion 51*d* is connected electrically by solder to a signal line, contact pad, or terminal formed on a printed circuit board.

The secondary terminal holding recessed portions 11*g* and the secondary terminal solder tail openings 11*h* are arranged side by side to form rows extending in the longitudinal direction of the housing 11. In the example shown in the drawing, there are two rows of three. At least a portion of each secondary terminal 61 is embedded in the bottom wall portion 11*b*, and at least a contact portion 61*a* is exposed inside each secondary terminal holding recessed portion 11*g*. A solder tail portion 61*d* to be soldered is exposed in each secondary terminal solder tail opening 11*h*. Therefore, the secondary terminals 61 held in each secondary terminal holding recessed portion 11*g* are arranged in two rows extending in the longitudinal direction of the housing 11. At least a portion of each secondary terminal 61 is embedded in the bottom wall portion 11*b*, and at least the contact portion 61*a* is exposed inside a secondary terminal holding recessed portion 11*g*. The contact portion 61*a* of each secondary terminal 61 is biased upwards by the spring action of the arm portion, and comes into contact with the corresponding electrode pad on the card 101 inside the card tray 160 held inside the card connector 1. Each solder tail portion 61*d* is connected electrically by solder to a signal line, contact pad, or terminal formed on a printed circuit board.

The primary terminals 51 are arranged so as to match the electrode pads on a microSD® card, and the secondary terminals 61 are arranged so as to match the electrode pads on a nanoSIM® card. In other words, the card connector 1 can accommodate different types of cards 101 housed in the card tray 160. For example, it can accommodate a card 101 that is a microSD® card or a nanoSIM® card. The number and arrangement of primary terminals 51 and secondary terminals 61 can be changed if necessary to conform to the number and arrangement of electrode pads on a card 101. When the card tray 160 can only accommodate a single type of card 101, either the primary terminals 51 or the secondary terminals 61 can be omitted.

The lower shell 12 is exposed between the bottom wall portion 11*b* and the left and right side wall portions 11*e*. A lock recessed portion 75 is formed on the inner side surface of each side wall portion 11*e* to engage a lock protruding portion 175*a* formed in the lock spring portion 175 of the card tray 160 and to hold and secure the card tray 160. Each lock recessed portion 75 is a recessed portion including a gradually sloping front inclined surface 75*a*1 and a sharply sloping rear inclined surface 75*a*2.

A push rod 22 is slidably mounted in the longitudinal direction on the inside surface of one of the side wall portions 11*e*. This serves as the tray ejection operation member in the tray ejection mechanism for ejecting the card tray 160 inserted into the card connector 1. The push rod 22 is a linear rod-shaped or band-shaped member, and a bent operating portion 22*a* is integrally connected to the rear end portion. An engaging portion 22*b* is formed in the front end portion of the push rod 22 to engage the force input portion 21*b* of the ejection lever 21. The ejection lever 21 is a lever-shaped member arranged near the inner wall portion 11*a*, and functions as the tray ejection lever of the tray ejection mechanism. As a result, the ejection lever 21 is pivotally mounted on the bottom wall portion 11*b* at the fulcrum portion 21*c*. The end on the other side of the fulcrum portion 21*c* from the force input portion 21*b* functions as the force output portion 21*a* which comes into contact with the front frame portion 165 of the card tray 160 inserted into the card connector 1 and applies force to the card tray 160 in the direction of ejection.

The shell 65 has side panel portions 63 extending from the side edges of a ceiling panel portion 62. A plurality of locking openings 63*a* are formed on the side panel portions 63. When the shell 65 is mounted on the upper side of the housing 11, the locking openings 63*a* are engaged by locking protrusions 13 formed on the outside surfaces of the side wall portions 11*e* of the housing 11, and the shell 65 is secured on the housing 11. Also, solder tail portions 64 are formed at any location on the lower end of the side panel portions 63. These serve as board-connectors and stand erect from the side panel portions 63 and extend outward in the transverse direction of the shell 65. The solder tail portions 64 are secured by soldering to anchoring pads formed on the surface of the board.

The housing 11 includes a movable member 17 and a fixed member 16 for a detection switch used to detect whether a card tray 160 inserted into the card connector 1 has reached a predetermined position inside the card connector 1 (the position at which the inserted card tray 160 is locked). When the card tray 160 has not reached the predetermined position, the movable member 17 and the fixed member 16 are separate, and the detection switch is not electrified or turned OFF. However, when the card tray 160 reaches the predetermined position, the movable member 17 presses against the front frame portion 165 of the card tray 160, and the movable member 17 is displaced and comes into contact with the fixed member 16. Because this electrifies or turns the detection switch ON, it is determined that the card tray 160 has reached the predetermined position.

The following is an explanation of the operations performed by a card connector 1 with the configuration described above. First, the operations performed to insert the card tray 160 will be explained.

Figures 6A, 6B:
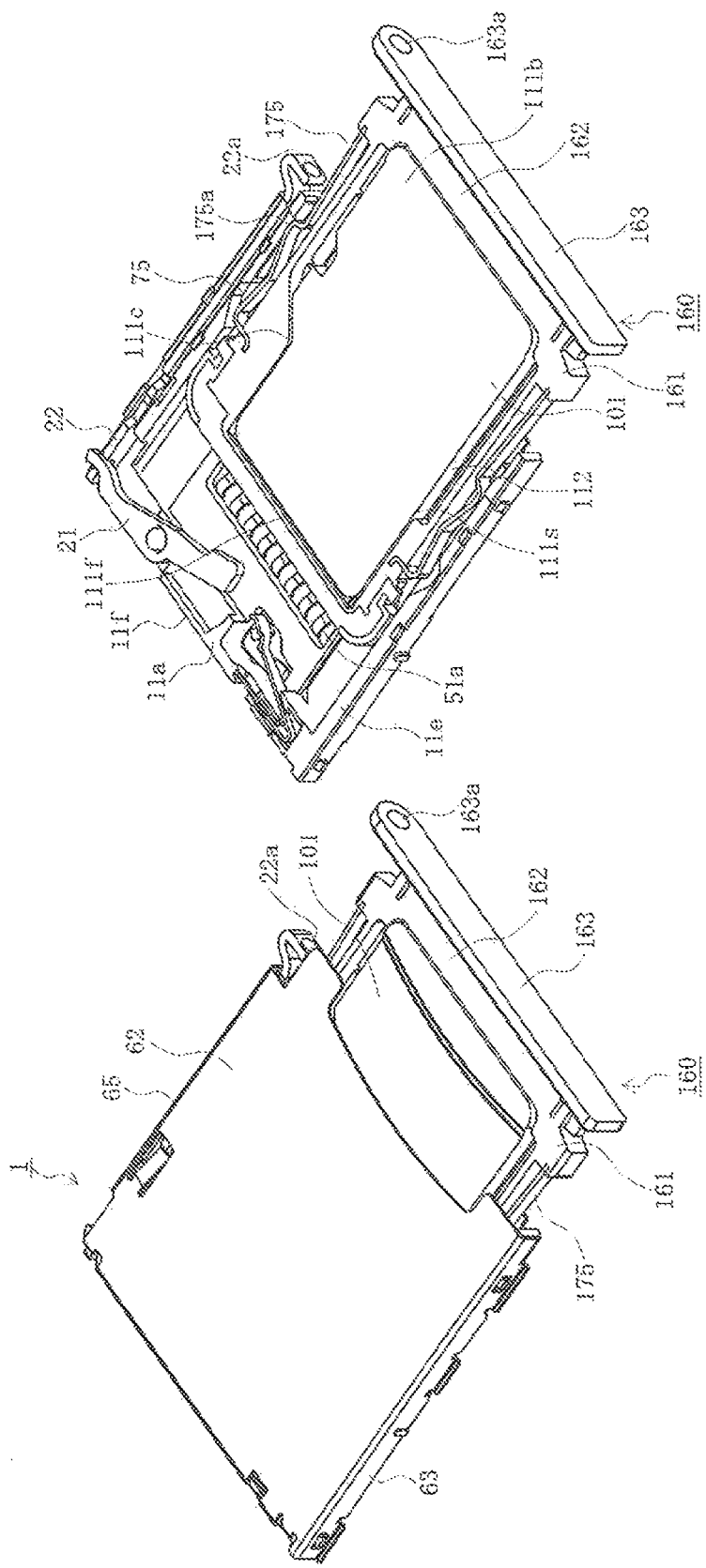
FIG. 6(a) is a perspective view of a card tray being inserted into a card connector according to an embodiment of the present disclosure, in which the shell is attached.
FIG. 6(b) is a perspective view of the card tray of FIG. 6(a) with the shell removed.
Figure 7:
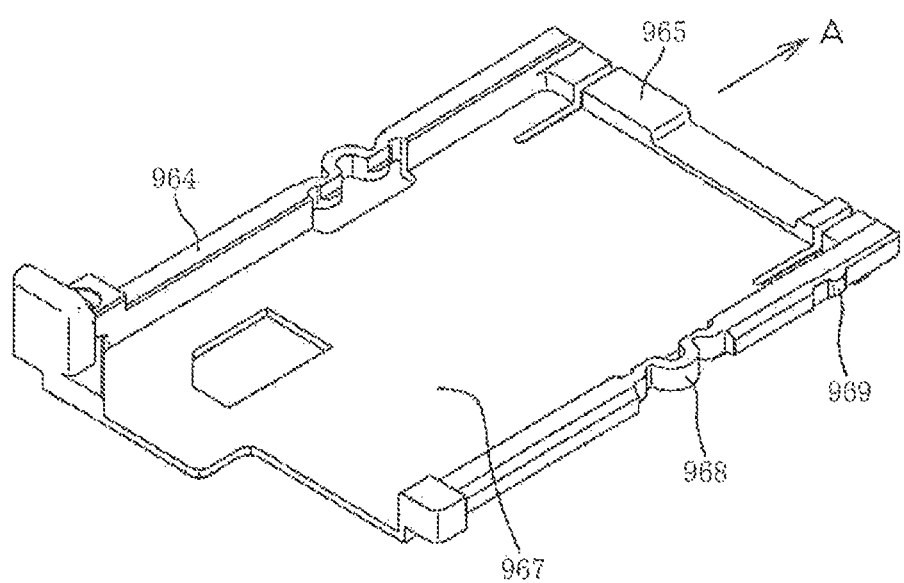
FIG. 7 is a perspective view of a card tray of the prior art.

FIGS. 6(*a*) and 6(*b*) are a pair of perspective views of a card tray being inserted into a card connector according to an embodiment of the present disclosure.

The user manually inserts a card tray 160 housing a card 101 into the insertion slot 18 in the rear of the card connector 1. Here, the card tray 160 is inserted properly with the upper surface facing upwards towards the ceiling panel portion 62 of the shell 65, the lower surface facing downwards towards the bottom wall portion 11*b* of the housing 11, and the front frame portion 165 facing the front end portion 11*f* of the housing 11. As a result, the upper surface 111*b* of the card 101 housed inside the space 166 which does not include any electrode pads faces upwards, and the lower surface including electrode pads and exposed on the lower surface of the card tray 160 is facing downwards. The card tray 160 can be inserted into the card connector 1 and ejected from the card connector 1 whether the tray is housing a card 101 or not housing a card 101. In the following explanation, the tray is housing a card 101. As mentioned above, the card 101 is a microSD® card.

When the card tray 160 is inserted from the insertion slot 18 into the card insertion space formed between the housing 11 and the shell 65, the card tray 160 advances into the card insertion space with the lower surfaces of the side frame portions 164 approaching or making contact with the upper surface of the lower shell 12. Next, as shown in FIG. 6(*b*), the lock protruding portions 175*a* of the lock spring portions 175 exposed on the outside of the side frame portions 164 of the card tray 160 make contact with the inner surface of the side wall portions 11*e* of the housing 11, and are elastically displaced inward in the transverse direction of the card tray 160.

Because the lock protruding portions 175*a* begin to be deformed when the front inclined surfaces 175*a*1 come into contact with the rear end portion 11*r* of the side wall portions 11*e*, the portion of the lock spring portions 175 in front of the lock protruding portions 175*a*, that is, the front half, is elastically deformed. Because the lock spring portions 175 include front corner portions 175*b*1 formed near the front end, the front half is very flexible (not too rigid). Therefore, when the lock protruding portions 175*a* come into contact with the inside surfaces of the side wall portions 11*e* and begin to be displaced, the rebound force of the spring action of the lock spring portions 175 is not too great, and the user can insert the card tray 160 smoothly without having to push in the card tray 160 with great force. When the card tray 160 advances towards the front end portion 11*f*, the lock protruding portions 175*a* slide over the inner surfaces of the side wall portions 11*e*.

Next, when the user pushes in the card tray 160, as shown in FIG. 1(*a*), the card tray 160 reaches the predetermined position inside the card connector 1. At this time, the movable portion 17 is pushed by the front frame portion 165 and comes into contact with the fixed member 16, turning the detection switch ON to indicate that the card tray 160 has reached the predetermined position inside the card connector 1.

As the card tray 160 advances to the predetermined position inside the card connector 1, the force output portion 21*a* of the ejection lever 21 is pushed by the front frame portion 165 and displaced further in the direction of the front end portion 11*f*. As a result, the force input portion 21*b* of the ejection lever 21 is displaced farther in the direction of the rear end portion 11*r*, and the push rod 22 slides to the position protruding farthest to the rear.

When the card tray 160 reaches the predetermined position inside the card connector 1, the force output portion 21*a* of the ejection lever 21 is interfered with by the inner wall portion 11*a* of the housing 11 and cannot be displaced any further in the direction of the front end portion 11*f*. As a result, the card tray 160 cannot advance any further.

When the card tray 160 has reached the predetermined position inside the card connector 1, the lock protruding portions 175*a* on the left and right lock spring portions 175 are biased by the spring action of the lock spring portions 175, are elastically displaced outward in the transverse direction of the card tray 160, and engage the lock recessed portions 75 formed on the inner surfaces of the side wall portions 11*e*. Here, front inclined surfaces 175*a*1 face front inclined surfaces 75*a*1, and rear inclined surfaces 175*a*2 face rear inclined surfaces 75*a*2. As a result, the card tray 160 is stably held and locked at the predetermined position, and is kept from becoming displaced from the predetermined position to the rear.

The card 101 housed inside the card tray 160 can exchange data along with the card tray 160 at the predetermined position using an arithmetic processing means in the electronic device mounted in the card connector 1. When the card 101 is held in the predetermined position, the contact portions 51*a* of the primary terminals 51 make contact with the electrode pads on the card 101 and establish an electrical connection.

The following is an explanation of the operations performed to eject a card tray 160 from the card connector 1.

First, the user manually inserts an auxiliary member such as a pin or rod into the through-hole 163*a* formed in the rear panel portion 163 from the rear of the card tray 160, and the tip of the auxiliary member is brought into contact with the operating portion 22*a* of the push rod 22. When the user pushes in the push rod 22 via the auxiliary member, the force input portion 21*b* of the ejection lever 21 engaging the engaging portion 22*b* of the push rod 22 is displaced forward. As a result, the front frame portion 165 is pressed against the force output portion 21*a* of the ejection lever 21, the card tray 160 moves to the rear from the predetermined position, the detection switch turns OFF, and movement of the card tray 160 to the rear of the predetermined position is detected. In addition, the lock protruding portions 175*a* of the lock spring portions 175 and the lock recessed portions 75 formed on the inside surface of the side wall portions 11*e* become disengaged. At this time, the lock protruding portions 175*a* engaging the lock recessed portions 75 are elastically displaced inward in the transverse direction of the card tray 160.

Because the lock protruding portions 175*a* begin to be deformed when the rear inclined surfaces 75*a*2 come into contact with the rear inclined surfaces 75*a*2 of the lock recessed portions 75 to the rear of the lock protruding portions 175*a*, that is, the rear half, is elastically deformed. Because the lock spring portions 175 include rear corner portions 175*b* formed near the rear end, the rear half is not very flexible (very rigid). Therefore, when the lock protruding portions 175*a* come into contact with the rear inclined surfaces 75*a*2 of the lock recessed portions 75 and begin to be displaced, the rebound force of the spring action of the lock spring portions 175 is great. As a result, the push rod 22 experiences resistance primarily from the spring action of the elastically deformed lock spring portions 175 via the card tray 160 and the ejection lever 21. However, because the resistance is not as great as the pressing force applied manually by the user, the rod moves forward against the resistance. Also, because the ejection lever 21 functions as a tray ejecting lever, great force can be applied to the card tray 160 in the ejection direction even when the pressing force applied manually by the user is fairly light.

In this way, the rear panel portion 163 of the card tray 160 protrudes sufficiently from the insertion slot 18 of the card connector 1. This allows the user to grasp the rear panel portion 163 and remove the card tray 160 from the card connector 1.

In the explanation, the lock spring portions 175 only included front corner portions 175*b*1. However, if necessary, the lock spring portions 175 can include both front corner portions 175*b*1 and rear corner portions 175*b*2, or can include only rear corner portions 175*b*2.

In the present embodiment, the card tray 160 was able to hold a card 101 including electrode pads and was able to be inserted into a card connector 1. The card tray 160 included a frame portion 161 opposing the side surfaces 112 of the card 101, and lock spring portions 175 able to engage and disengage from lock recessed portions 75 on the card connector 1. The lock spring portions 175 were metal plate springs including only one corner portion 175b each and were elastically deformable in the transverse direction of the card tray 160.

In this way, the spring action of the lock spring portions 175 is improved, and the card tray 160 can be easily inserted into the card connector 1 and held securely inside the card connector 1. As a result, the card tray 160 is not discharged even when the card connector 1 is subjected to a blow, and external force is applied to the card tray 160 in the release direction from the card connector 1. Because the amount of elastic deformation by the lock spring portions 175 is great due to the corner portions 175b, they are not plastically deformed or damaged. As a result, higher reliability is achieved.

Each lock spring portion 175 is a band-like member secured to the frame portion 161 at both ends and including a main body portion 175d extending linearly and an engaging portion 175a able to engage a lock recessed portion 75. Here, a corner portion 175b is connected to at least one end of the main body portion 175d. Because each lock spring portion 175 is a single unit and has a lock protruding portion 175a that can be significantly displaced, they can reliably engage and disengage from the lock recessed portions 75. This also reduces the manufacturing costs of the lock spring portions 175 and, as a result, lowers the overall manufacturing costs of the card tray 160.

The corner portions 175b are metal plates which are bent from the longitudinal direction of the card tray 160 to a direction intersecting the longitudinal direction. This increases the amount of elastic deformation by the corner portions 175b and, as a result, also increases the overall amount of elastic deformation by the lock spring portions 175.

The lock protruding portions 175a include a front inclined surface 175a1 and a rear inclined surface 175a2 near the apex, and the protruding portions bulge outward in the transverse direction of the card tray 160. The lock recessed portions 75 include a front inclined surface 75a1 and a rear inclined surface 75a2. As a result, the lock protruding portions 175a are smoothly displaced when the card tray 160 is inserted into the card connector 1 and ejected from the card connector 1. In other words, the card connector 160 can be smoothly inserted and ejected.

Also, the corner portions 175b are connected only to the front ends of the main body portion 175d. The rear ends of the main body portion 175d are secured to the frame portion 161. Because the lock protruding portions 175a are flexibly displaced when the card tray 160 is inserted into the card connector 1, the card connector 160 can be easily inserted. When the card tray 160 is ejected from the card connector 1, the lock protruding portions 175a are not easily displaced and the lock recessed portions 75 are not easily disengaged. As a result, the card tray 160 is reliably held inside the card connector 1, and the card tray 160 is not discharged even when the card connector 1 is subjected to a blow and external force is applied to the card tray 160 in the release direction from the card connector 1.

The present disclosure is not limited to the embodiments described above. Variations based on the spirit of the disclosure are possible, and these do not depart from the scope of the present disclosure.

The present disclosure can be applied to a card holding member and a card connector.

The invention claimed is:

1. A card holding member able to hold a card including terminal members and able to be inserted into a card connector, the card holding member comprising:
   a frame portion which surrounds four sides of a card receiving space, but not surrounding a top side and a bottom side of the space; and
   a movable lock portion arranged in the frame portion which is configured to engage and disengage from a lock portion of a housing of the card connector, the movable lock portion being a spring member made of a metal plate and including at least one corner portion, the movable lock portion being elastically deformable in a width direction of the card holding member.

2. The card holding member according to claim 1, wherein the at least one corner portion is a portion of a metal plate bent from the longitudinal direction of the card holding member to a direction intersecting the longitudinal direction.

3. The card holding member according to claim 2, wherein the engaging portion includes a front inclined surface and a rear inclined surface formed in front of and behind an apex point, the engaging portion being a protruding portion bulging outwardly in the transverse direction of the card holding member.

4. The card holding member according to claim 3, wherein the at least one corner portion is connected only to the front end of the main body portion, the rear end of the main body portion being secured to the frame portion.

5. The card holding member according to claim 1, wherein the movable lock portion is a band-like member fixed to the frame portion at both ends and including a main body portion extending linearly, and an engaging portion formed in a middle of the main body portion, the engaging portion being configured to engage the lock portion of the housing of the card connector, the corner portion being connected to at least one end of the main body portion.

6. The card holding member according to claim 5, wherein the at least one corner portion is connected only to the front end of the main body portion, the rear end of the main body portion being secured to the frame portion.

7. The card holding member according to claim 5, wherein the engaging portion includes a front inclined surface and a rear inclined surface formed in front of and behind an apex point, the engaging portion being a protruding portion bulging outwardly in the transverse direction of the card holding member.

8. The card holding member according to claim 7, wherein the at least one corner portion is connected only to the front end of the main body portion, the rear end of the main body portion being secured to the frame portion.

9. The card holding member according to claim 5, wherein the at least one corner portion is a portion of a metal plate bent from the longitudinal direction of the card holding member to a direction intersecting the longitudinal direction.

10. The card holding member according to claim 9, wherein the at least one corner portion is connected only to the front end of the main body portion, the rear end of the main body portion being secured to the frame portion.

11. The card holding member according to claim 9, wherein the engaging portion includes a front inclined surface and a rear inclined surface formed in front of and behind an apex point, the engaging portion being a protruding portion bulging outwardly in the transverse direction of the card holding member.

12. The card holding member according to claim 11, wherein the at least one corner portion is connected only to the front end of the main body portion, the rear end of the main body portion being secured to the frame portion.

13. A card holding member able to hold a card having terminal members and able to be inserted into a card connector, the card holding member comprising:
   a frame portion which surrounds four sides of a card receiving space, but not surrounding a top side and a bottom side of the space; and
   the frame portion having a rear frame portion, a front frame portion and a pair of side frame portions, the rear frame portion and the front frame portion extending parallel to each other in a transverse direction, the side frame portions extending in a longitudinal direction and being connected to ends of the rear and front frame portions, at least one of the side frame portions having a non-metal portion and a metal portion, the metal portion having a movable lock portion, the movable lock portion being elastically deformable in the transverse direction, the movable lock portion having first and second end portions and a main body portion extending linearly between the first and second end portions, the first and second end portions being fixed to the non-metal portion, the movable lock portion having at least one corner portion which is connected to at least one of the first and second end portions, the main body portion having an engaging portion formed in a middle thereof, the engaging portion being configured to engage and disengage from a lock portion of a housing of the card connector; and
   a rear panel portion connected to a rear of the rear frame portion.

14. The card holding member according to claim 13, wherein the at least one corner portion is a portion of the movable lock portion which is bent from the longitudinal direction of the card holding member to a direction intersecting the longitudinal direction.

15. The card holding member according to claim 13, wherein the engaging portion includes a front inclined surface and a rear inclined surface formed in front of and behind an apex point, the engaging portion being a protruding portion bulging outwardly in the transverse direction of the card holding member.

16. The card holding member according to claim 13, wherein the at least one corner portion is connected only to the front end of the main body portion, the rear end of the main body portion being secured to the non-metal portion.

17. A combination comprising: a card connector having a housing having a lock portion; and
   a card holding member, the card holding member being configured to hold a card having terminal members and being configured to be inserted into the card connector,
   a frame portion which surrounds four sides of a card receiving space, but not surrounding a top side and a bottom side of the space; and
   a movable lock portion arranged in the frame portion which is configured to engage and disengage from the lock portion of the housing of the card connector, the movable lock portion being a spring member made of a metal plate and including at least one corner portion, the movable lock portion being elastically deformable in a width direction of the card holding member.

18. A combination comprising: a card connector having a housing having a lock portion; and
   a card holding member, the card holding member being configured to hold a card having terminal members and being configured to be inserted into the card connector, the card holding member having a frame portion and a rear panel portion,
   a frame portion which surrounds four sides of a card receiving space, but not surrounding a top side and a bottom side of the space; and
   the frame portion having a rear frame portion, a front frame portion and a pair of side frame portions, the rear frame portion and the front frame portion extending parallel to each other in a transverse direction, the side frame portions extending in a longitudinal direction and being connected to ends of the rear and front frame portions, at least one of the side frame portions having a non-metal portion and a metal portion, the metal portion having a movable lock portion, the movable lock portion being elastically deformable in the transverse direction, the movable lock portion having first and second end portions and a main body portion extending linearly between the first and second end portions, the first and second end portions being fixed to the non-metal portion,
   the movable lock portion having at least one corner portion which is connected to at least one of the first and second end portions, the main body portion having an engaging portion formed in a middle thereof, the engaging portion being configured to engage and disengage from the lock portion of the housing of the card connector, the rear panel portion connected to a rear of the rear frame portion.

\* \* \* \* \*